(No Model.) 2 Sheets—Sheet 1.
W. D. MILLER.
SWINGING GATE.
No. 563,393. Patented July 7, 1896.
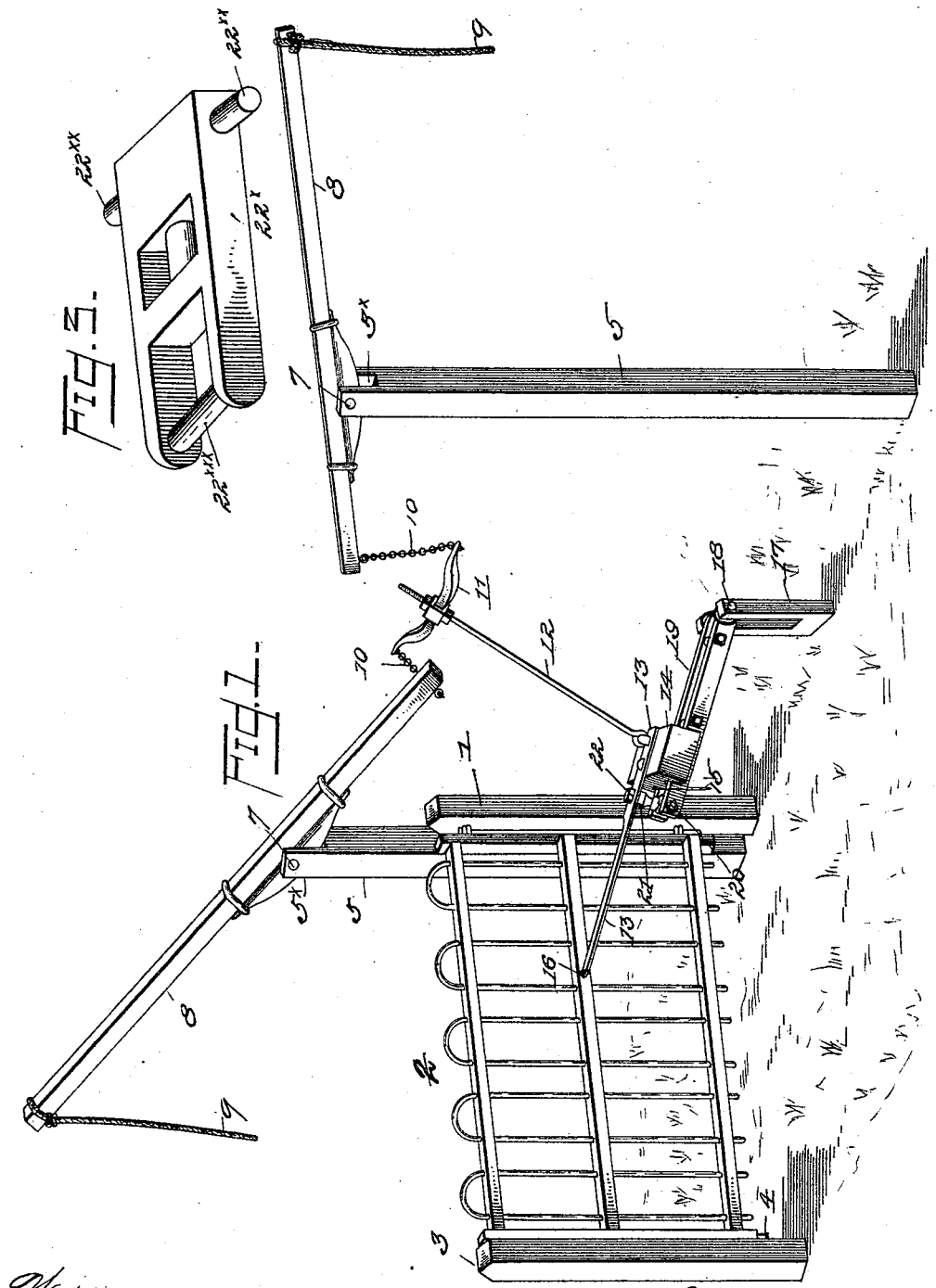
Witnesses:
A. Walton
D. R. Moore.
Inventor:
Wm. D. Miller.
By Wm. J. Moore.
Atty.
THE NORRIS PETERS CO. PHOTO-LITHO., WASHINGTON, D. C.

(No Model.) 2 Sheets—Sheet 2.
W. D. MILLER.
SWINGING GATE.
No. 563,393. Patented July 7, 1896.
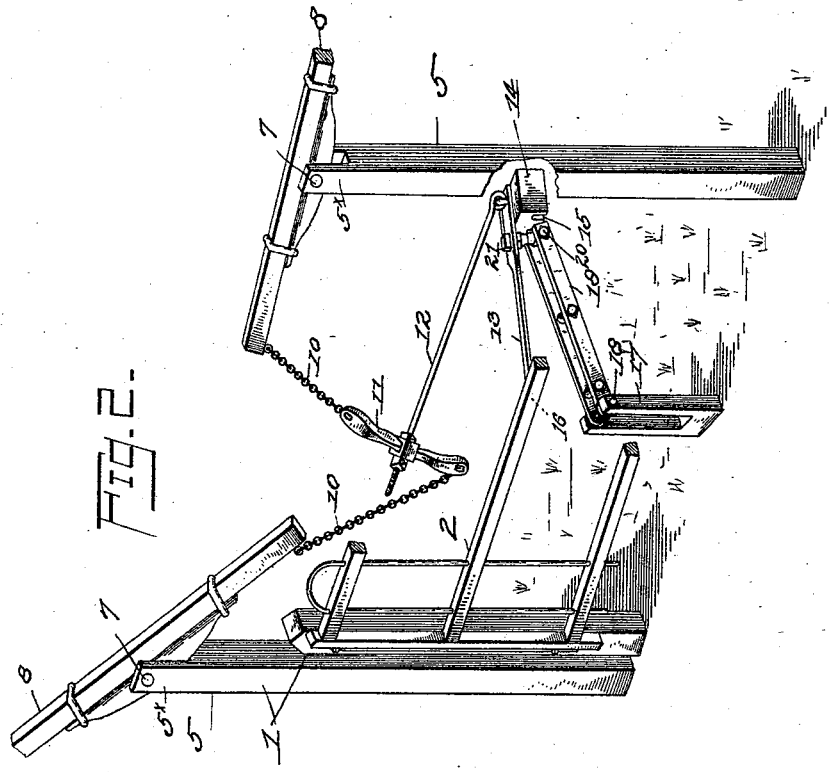
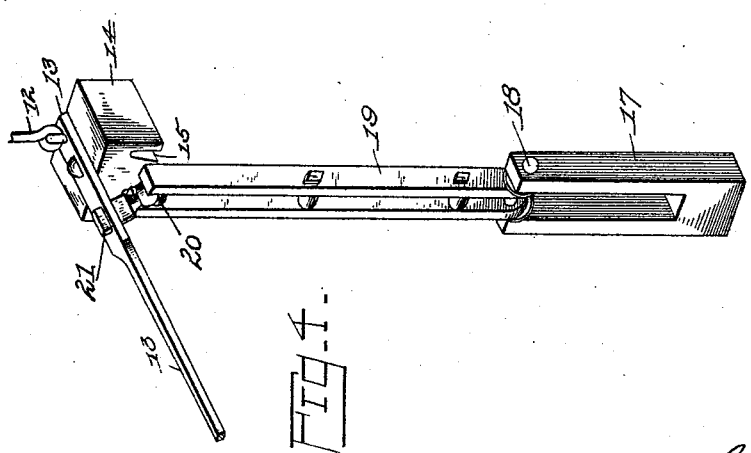
Witnesses:
C. S. Walton
D. R. Moore.
Inventor:
Wm. D. Miller,
by Wm. N. Moore,
Attorney.

UNITED STATES PATENT OFFICE.

WILLIAM D. MILLER, OF LEBANON, KENTUCKY.

SWINGING GATE.

SPECIFICATION forming part of Letters Patent No. 563,393, dated July 7, 1896.

Application filed November 26, 1895. Serial No. 570,192. (No model.)

*To all whom it may concern:*

Be it known that I, WILLIAM D. MILLER, a citizen of the United States, residing at Lebanon, in the county of Marion and State of Kentucky, have invented certain new and useful Improvements in Swinging Gates; and I do hereby declare the following to be a full, clear, and exact description of the invention, such as will enable others skilled in the art to which it appertains to make and use the same.

My invention relates to improvements in gates, and one object of my invention is the provision of a gate which can be opened from either side of the gate by a person on foot or riding and which will be superior in point of simplicity, durability, and inexpensiveness, and thus prove practical.

A further object is the provision of a gate which will be so hinged and balanced that the gate will automatically close when not opened to its full extent, as in allowing the passage of persons.

To attain the desired objects, the invention consists of a gate embodying novel features of construction and combination of parts, substantially as disclosed herein.

Figure 1 represents a perspective view of my gate with the parts in the position they take when the gate is closed. Fig. 2 represents a similar view with the parts in the position they assume when the gate is open, a portion of the gate being broken away. Figs. 3 and 4 are detail views of the operating mechanism for opening, closing, and locking the gate.

Referring by numerals to the drawings, the numeral 1 designates the hinge-post. 2 designates the gate hinged to said post, and 3 designates the latch-post, having the vertical abutting strip 4, which limits the movement of the gate, as is evident. On each side of the hinge-post and gate and in line with said post are the road posts or uprights 5, which are taller than the other posts and have their upper ends $5^\times$ bifurcated to receive pivots 7 for the levers 8, employed in opening and closing the gate from either side thereof, the outer ends of the levers having depending cords 9, to be grasped for drawing the levers down.

To the inner end of the levers are connected the upper ends of the cords or chains 10, the lower ends whereof are connected to the outer ends of cross-bar 11, secured to or near the upper end of the rod 12, which in turn has its lower end secured to the outer end of the lever 13.

The lever 13 has at its outer end and depending therefrom the weight 14, formed with grooves or kerfs 15, and the inner end of said lever 13 is connected to the side of the gate, as shown at 16.

Arranged at an angle or incline to the gate and mounted in the ground and to one side of the gate is the bifurcated support 17, having therein the rod 18, on which is mounted the link 19, composed of two parallel bars or strips secured together, and in the upper portion of said link is journaled the rod 20, having the lug or stud 21 loosely connected to the lever 13 adjacent to its outer or weighted end, as at 22, and forming an inverted-T-shaped loose connection between the said lever and link. In the form of device shown in Fig. 3 I make a single casting $22^\times$, having the journals $22^{\times\times}$ and carrying the rod $22^{\times\times\times}$, to which the stud 21 is connected.

This being the construction of my gate, the consequent operation, briefly stated, is as follows: The parts are in their normal position as seen in Fig. 1, the lever and link being in the same inclined plane with their members parallel and the grooves of the weight engaging the bars forming the link, and in this position the gate is locked and cannot be pushed open. A person on either side of the gate draws down (by means of the depending cord) one of the operating-levers. This action lifts the weighted outer end of the lever and with it draws outward the gate and the link on which the lever is supported, and the gate opens, the weight preventing a dead-center. To close the gate, it is simply necessary to draw upon the other lever, which action moves the weighted lever, link, and gate inward, and the weight falls upon the link and the kerfs engage the bars thereof, as shown, forming a lock.

It will also be noticed that, if desired, the gate can be only partly opened to allow the passage of a person on foot, and it will be closed by the action of the weighted lever, the weight descending and moving the gate, as is evident.

It will thus be seen that the peculiar construction, arrangement, and connection of the weighted lever causes it to assist in the opening and closing of the gate and also forms a lock for the gate.

I claim—

1. The combination with a gate, the lever having its inner end connected to one side thereof and having its outer end weighted, a link having its lower end pivoted to a rigid support and carrying at its upper end a head connected to said lever between its ends and adjacent to the weighted end thereof, the rod connected at its lower end to the weighted end of the lever and having the cross-bar at its upper end and the operating-levers having their inner ends connected to said cross-bar for moving the weighted levers to open and close the gate.

2. The combination of the operating-levers, the cross-bar having its outer ends connected to the inner ends of said levers, the rod connected to the cross-bar, the weighted lever having its outer end connected to the rod and its inner end connected to the gate, the link pivoted at its lower end, the swiveled head mounted in the upper end of the link and connected to the lever near the weighted end thereof.

3. The combination of the gate, the lever having its inner end connected to one side thereof and having the weight at the other end provided with grooves or kerfs, the link composed of two parallel bars and having its upper end loosely connected to the lever in front of the weight, and having the bars thereof fitting the grooves and its lower end pivoted to a rigid support, the rod connected to the weighted outer end of the lever and the operating-levers connected to the rod.

In testimony whereof I affix my signature in presence of two witnesses.

WM. D. MILLER.

Witnesses:
H. W. RIVES,
OLIVER KELLY, Jr.